3,036,952
ALKYNE SUBSTITUTED PHOSPHATE AND THIOPHOSPHATE ESTERS

John P. Chupp, Kirkwood, Mo., assignor to Monsanto Chemical Company, a corporation of Delaware
No Drawing. Filed Nov. 9, 1959, Ser. No. 851,502
15 Claims. (Cl. 167—22)

This invention relates to new organic phosphorus compounds and to insecticidal formulations comprising such compounds. More particularly, this invention is concerned with those phosphorus compounds which are derived from the interaction of a halogenated alkyne ether or sulfide and a salt of phosphorothioic acid.

It is an object of this invention to provide new and useful compounds of phosphorus. It is a further object of this invention to provide a new class of highly useful insecticides. Still a further object is to provide new and useful formulations comprising such insecticides.

The compounds of the present invention are phosphorus derivatives of the general formula:

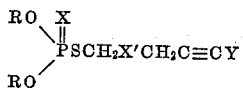

where R is an alkyl radical having from 1 to 8 carbon atoms, X and X' are oxygen or sulfur, and Y is selected from hydrogen and

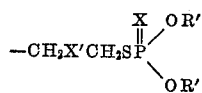

where R' is an alkyl radical having from 1 to 8 carbon atoms and X and X' have the same meaning as above.

Included within the above general structural formula is a preferred group of compounds which have the formula:

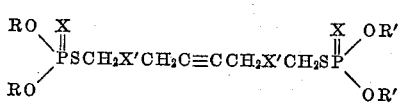

wherein R and R' represent like or unlike lower alkyl radicals, and X and X' are oxygen or sulfur. As employed herein, the term "lower" connotes the straight or branched chain radicals having from 1 to about 4 carbon atoms. The compounds of this group display an optimum degree of biocidal activity against a wide variety of pests.

The new compounds of this invention may be prepared by reacting a halogenated alkyne ether or sulfide with a salt of a phosphorothioic acid. The proportions of the reactants will vary depending upon the product desired. When Y in the above formula is hydrogen, the alkyne employed is monohalogenmethyl propargyl ether or sulfide. In all other cases, a bis(halogenmethyl)2-butyne ether or sulfide is employed. For the preparation of compounds requiring the latter alkyne, at least two molecular proportions of the acid salt are reacted with one molecular proportion of the halogenated alkyne ether or sulfide. Substantially equal molecular proportions are reacted where the monohalogenated methyl propargyl ether or sulfide is used.

The invention will be more fully understood by reference to the following examples. These examples, however, are given for the purpose of illustration only and are not to be construed as limiting the scope of the invention in any way.

EXAMPLE I

S,S'-(2,7-Dioxa-4-Octyne-1,8-Dithiol) Bis
(O,O-Diethyl Phosphorodithioate)

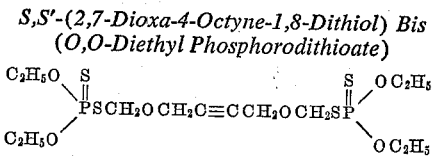

A suitable reactor was charged with 44.6 grams (0.22 mole) of ammonium O,O-diethyl phosphorodithioate dissolved in 100 ml. of acetone. To this mixture was added 18.3 grams (0.10 mole) of 1,8-dichloro-2,7-dioxaoctyne-4 at room temperature with stirring. The resultant mixture was heated at refluxing temperature for 3 hours after which about ¾ of the acetone was stripped off under vacuum. The residue was then cooled, and about 50 ml. of water was added with stirring. After about 5 minutes of stirring, 100 ml. of chloroform was added, and the resultant mixture was separated in a separatory funnel. The chloroform layer was washed with 3% sodium carbonate solution, then twice with water, and the resulting chloroform solution was then stripped to 100° C. at 10 mm. pressure. A yield of S,S'-(2,7-dioxa-4-octyne-1,8-dithiol) bis (O,O-diethyl phosphorodithioate) was obtained as residue. Analysis showed 11.8% phosphorus and 25.8% sulfur as compared with calculated values of 12.8% phosphorus and 26.5% sulfur.

The following compounds are also prepared by this procedure, the appropriate phosphorodithioate being substituted:

S,S'-2,7-dioxa-4-octyne-1,8-dithiol) bis (O,O-di-tert.-butyl phosphorodithioate)
S,S'-(2,7-dioxa-4-octyne-1,8-dithiol) bis (O,O-diisoamyl phosphorodithioate)
S,S'-(2,7-dioxa-4-octyne-1,8-dithiol) bis (O,O-di-n-octyl phosphorodithioate)

By substituting a dithiaoctyne for the dioxaoctyne, other compounds prepared with the appropriate phosphorodithioates are:

S,S'-(2,7-dithia-4-octyne-1,8-dithiol) bis (O,O-di-sec.-butyl phosphorodithioate)
S,S'-(2,7-dithia-4-octyne-1,8-dithiol) bis [O,O-di (2-ethylhexyl) phosphorodithioate]

EXAMPLE II

S,S'-(2,7-Dioxa-4-Octyne-1,8-Dithiol) Bis
(O,O-Diethyl Phosphorodithiolate)

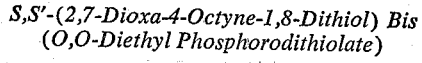
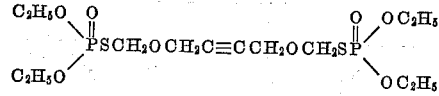

A suitable reactor was charged with 39.3 grams (0.21 mole) of ammonium O,O-diethyl phosphorothioate dissolved in 150 ml. of acetone. There was added 18.3 grams (0.10 mole) of 1,8-dichloro-2,7-dioxaoctyne-4 with stirring. The mixture was heated at refluxing temperature for 5 to 6 hours and then cooled. The reaction product was filtered, and the filtrate was stripped of acetone. The residue was worked up in the same manner as in Example I. A yield of 37.4 grams (82.5% of theory) of S,S'-(2,7-dioxa-4-octyne-1,8-dithiol) bis (O,O-diethyl phosphorothiolate) was obtained.

Employing different phosphorothiolates in the above procedure, and using either dioxaoctyne or dithiaoctyne, other compounds prepared are:

S,S'-(2,7-dioxa-4-octyne-1,8-dithiol) bis (O,O,diisopropyl phosphorothiolate)

S,S'-(2,7-dioxa-4-octyne-1,8-dithiol) bis (O,O-di-tert.-pentyl phosphorothiolate)
S,S'-(2,7-dithia-4-octyne-1,8-dithiol) bis (O,O-dimethyl phosphorothiolate)
S,S'-(2,7-dithia-4-octyne-1,8-dithiol) bis (O,O-di-n-heptyl phosphorothiolate)

EXAMPLE III

*O,O-Diethyl S-(2-Propynyloxymethyl) Phosphorodithioate*

$$\begin{array}{c}C_2H_5O\\ \diagdown\\ C_2H_5O\end{array}\!\!\overset{S}{\underset{\|}{P}}SCH_2OCH_2C\!\equiv\!CH$$

A suitable reactor was charged with 43 grams (.21 mole) of ammonium O,O-diethyl phosphorodithioate in 100 ml. of acetone and 20 grams (0.192 mole) of propargyl chloromethylether. The mixture was stirred and heated at refluxing temperature for 3 hours. The reaction product was cooled and filtered, and the filtrate was stripped of acetone. Chloroform was introduced into the reactor, and the resultant mixture was washed with sodium carbonate solution and water as described in Example I. The chloroform was removed by stripping to 100° C. at 5 to 10 mm. pressure. The residue was filtered through Attapulgus clay. There was obtained a 91% yield of O,O-diethyl S-(2-propynyloxymethyl) phosphorodithioate. Analysis showed 11.5% phosphorus and 25.5% sulfur as compared with calculated values of 12.2% phosphorus and 25.2% sulfur.

EXAMPLE IV

*O,O-Diethyl S-(2-Propynyloxymethyl) Phosphorothiolate*

$$\begin{array}{c}C_2H_5O\\ \diagdown\\ C_2H_5O\end{array}\!\!\overset{O}{\underset{\|}{P}}SCH_2OCH_2C\!\equiv\!CH$$

In the procedure of Example III, 39.2 grams (0.21 mole) of ammonium O,O-diethyl phosphorothiolate was substituted for the dithioate. A yield of 92.2% of the desired phosphorothiolate was obtained.

Following the procedure of Example III with other phosphorothioates and either the propargyl ether or sulfide, different compounds prepared are:

O,O-dimethyl S-(2-propynylthiomethyl) phosphorodithioate
O,O-diisopropyl S-(2-propynylthiomethyl) phosphorodithioate
O,O-diethyl S-(2-propynylthiomethyl) phosphorodithioate
O,O-di-n-butyl S-(2-propynyloxymethyl) phosphorothiolate
O,O-di-n-propyl S-(2-propynyloxymethyl) phosphorothiolate

EXAMPLE V

*S,S'-(2,7-Dioxa-4-Octyne-1,8-Dithiol) Bis(O,O-Dimethyl Phosphorodithioate)*

$$\begin{array}{c}CH_3O\\ \diagdown\\ CH_3O\end{array}\!\!\overset{S}{\underset{\|}{P}}SCH_2OCH_2C\!\equiv\!CCH_2OCH_2S\overset{S}{\underset{\|}{P}}\!\!\begin{array}{c}OCH_3\\ \diagup\\ OCH_3\end{array}$$

A suitable reactor was charged with 12.5 grams (0.07 mole) of ammonium O,O-dimethyl phosphorodithioate dissolved in 100 ml. of acetone. To this mixture was added 6.0 grams (0.0328 mole) of 1,8-dichloro-2,7-dioxaoctyne-4 with stirring. The resultant mixture was heated at refluxing temperature for 4 hours after which it was cooled and filtered. The filtrate was washed with 50 ml. of acetone. The washings and the filtrate were then stripped of acetone under vacuum to a temperature of 30° C. The residue was taken up with 100 ml. of methylene chloride, washed once with 100 ml. of 5% sodium carbonate solution, and washed twice with 200 ml. portions of water. The methylene chloride was then stripped off at 100° C. at 10 mm. of pressure. There was obtained 8 grams of S,S'-(2,7-dioxa-4-octyne-1,8-dithiol) bis(O,O-dimethyl phosphorodithioate). Analysis showed 29.9% sulfur and 13.7% phosphorus as against calculated values of 30.0% and 14.5% respectively.

EXAMPLE VI

*S,S'-(2,7-Dioxa-4-Octyne-1,8-Dithiol) Bis(O,O-Di-n-Propyl Phosphorodithioate)*

$$\begin{array}{c}C_3H_7O\\ \diagdown\\ C_3H_7O\end{array}\!\!\overset{S}{\underset{\|}{P}}SCH_2OCH_2C\!\equiv\!CCH_2OCH_2S\overset{S}{\underset{\|}{P}}\!\!\begin{array}{c}OC_3H_7\\ \diagup\\ OC_3H_7\end{array}$$

A suitable reactor was charged with 16.15 grams (0.07 mole) of ammonium O,O-di-n-propyl phosphorodithioate dissolved in 150 ml. of acetone. There was added 6.0 grams (0.0328 mole) of 1,8-dichloro-2,7-dioxaoctyne-4 with stirring. The mixture was treated and worked up in the manner described in Example V to yield S,S'-(2,7-dioxa-4-octyne-1,8-dithiol) bis(O,O-di-n-propyl phosphorodithioate). Analysis showed 23.9% sulfur and 11.1% phosphorus as compared with calculated values of 23.9% and 11.5% respectively.

EXAMPLE VII

*2,7-Dioxa-4-Octyne-1,8-Dithiol S-(O,O-Dimethyl Phosphorodithioate) S'-(O,O-Diisopropyl Phosphorodithioate)*

$$\begin{array}{c}CH_3O\\ \diagdown\\ CH_3O\end{array}\!\!\overset{S}{\underset{\|}{P}}SCH_2OCH_2C\!\equiv\!CCH_2OCH_2S\overset{S}{\underset{\|}{P}}\!\!\begin{array}{c}OCH(CH_3)_2\\ \diagup\\ OCH(CH_3)_2\end{array}$$

Into a suitable reactor containing 6.12 grams (0.035 mole) of ammonium O,O-dimethyl phosphorodithioate in 150 ml. of acetone was charged 8.1 grams (0.035 mole) of ammonium O,O-diisopropyl phosphorodithioate. There was then added 6.0 grams (0.038 mole) of 1,8-dichloro-2,7-dioxaoctyne-4 with stirring. After heating the mixture at refluxing temperature for 4 hours, the reaction product was worked up as described in Example V to yield 2,7-dioxa-4-octyne-1,8-dithiol S-(O,O-dimethyl phosphorodithioate) S'-(O,O-diisopropyl phosphorodithioate).

Using other phosphorothioates with the dioxaoctyne or a dithiaoctyne, the following compounds are prepared by the above procedure:

2,7-dioxa-4-octyne-1,8-dithiol S-(O,O-di-n-hexyl phosphorothiolate) S'-(O,O-diisopropyl phosphorothiolate)
2,7-dioxa-4-octyne-1,8-dithiol S-(O,O-di-tert.-butyl phosphorothiolate) S'-(O,O-dioctyl phosphorothiolate)
2,7-dithia-4-octyne-1,8-dithiol S-(O,O-di-n-propyl phosphorothiolate) S'-(O,O-diethyl phosphorodithioate)
2,7-dioxa-4-octyne-1,8-dithiol S-(O,O-diisopropyl phosphorothiolate) S'-(O,O-di-n-propyl phosphorothiolate)
2,7-dioxa-4-octyne-1,8-dithiol S-(O,O-dimethyl phosphorothiolate) S'-(O,O-diethyl phosphorothiolate)
2,7-dioxa-4-octyne-1,8-dithiol S-(O,O-diisopropyl phosphorodithioate) S'-(O,O-diethyl phosphorodithioate)
2,7-dithia-4-octyne-1,8-dithiol S-(O,O-diethyl phosphorodithioate) S'-(O,O-di-n-propyl phosphorodithioate)

The specific activity of some of the individual compounds disclosed herein is enumerated below. At the outset it should be made clear that such data is merely exemplary, and that similar results are obtained by employing any of the other compounds within the scope of this invention. The effectiveness of the new compounds of this invention was demonstrated in contact tests on the mobile and resting stages, as well as on the ova, of the two-spotted spider mite. A concentration of .1% resulted in 100% kill with the compounds of Examples I and II. With the concentration reduced to .05%, the compound of Example I gave 100% against the mobile stage and 90% kill against the resting stage and ova while similar results were obtained with .025% concentration of the compound of Example II. The residual activity of the compounds of this invention was tested on red flour beetle adults. When these insects were confined on filter paper which had been treated with a 1% acetone solution of the compound of Example III, 100% kill was noted. Using the compound of Example II in the same concentration gave a 90% kill.

As indicative of the systemic activity of these compounds, the excised stems of bean plants were immersed in diluted emulsions of the compound of Example II for three days. Leaves were then excised and infested with the two-spotted spider mite. When a concentration of .01% was employed, 90% kill resulted after 48 hours. Against yellow fever mosquito larvae, contact tests using the compounds of Examples I and III gave 100% kill at a concentration of .001%. The latter compound also gave a 90% kill when the concentration was reduced to .000125%.

It will be understood that the terms "insect" and "insecticide" are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, section 2, substation $h$, wherein the term "insect" is used to refer not only to those small invertebrate animals belonging mostly to the class Insecta, comprising six-legged, usually winged forms, as beetles, bugs, bees, flies, and so forth, but also to their allied classes of arthropods whose members are wingless and usually have more than six legs, as spiders, mites, ticks, centipedes, and wood lice.

For maximum effectiveness the active ingredients of the present invention are admixed in insecticidally effective amount with an insecticidal adjuvant. In order to provide formulations particularly adapted for ready and efficient application to insects using conventional equipment, such formulations comprise those of both the liquid and solid types as well as the "Aerosol" type formulations. Application may be directly to the insects to the plant hosts of such insect to soil or other media used for growing plants. In the pure state the active ingredients may be too effective or too potent in some applications to have practical utility. For example, for most effective protection, it is preferred to apply the materials in intimate contact but thoroughly dispersed on the surface to be protected. Therefore, the active ingredients have incorporated therewith a relatively inert surface-active agent or adjuvant as a dispersing medium. Furthermore, such adjuvants have the effect of requiring only minute quantities of said ingredients of some formulations to obtain effective protection. A further advantage of so extending this material is to permit field application by methods readily employed and still obtain effectively complete coverage of the material being protected.

Thus, the formulations of this invention comprise the above defined active ingredients and a suitable material as an adjuvant, therefor. The important feature of the invention is to provide an adjuvant such that upon the preparation of a formulation of a concentration appropriate for any particular application, the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with a diluent or carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

In the preparation of the above described concentrates, the active ingredient may comprise up to about 95% of the concentrated formulation. To obtain 100 parts of a ready to use liquid formulation, from 1 to 50 parts of a concentrate is admixed with from 50 to 99 parts of a diluent or carrier. Although it is not intended that this ingredient be limited to any specific proportions of active ingredient and adjuvant, it should be noted that ready to use liquid formulations comprising from about 0.001 to 5% of the active ingredient based upon the weight of the formulation are preferred. In such liquid formulations it is also preferred that the adjuvant comprise less than about 5% based upon the weight of the formulation. With ready to use solid formulations, the parts of concentrate and diluent or carrier are substantially the same as defined for the liquids. However, in such solid formulations, the use of from about 2.5 to 25% of the active ingredient based upon the weight of the formulation is preferred. The percentage of adjuvant preferred in the solids is substantially the same as in the liquid formulations.

It is also intended that the term "adjuvant" includes solid carriers of the type of pyrophyllite, talc, clay, diatomaceous earth, and the like; and various mineral powders, such as calcium sulfate and the like, which act as a dispersant, as a carrier, and in some instances perform the function of a surface-active agent.

Another method of applying these insecticides is in the form of a water suspension. However, to obtain an active aqueous suspension, there should be employed a surface-active agent in sufficient amount to disperse and suspend the active ingredient. Examples of such surface-active agents which can be employed in forming dispersions include the soft or hard sodium or potassium soaps, tall oil, salts of the alkyl and alkylaryl sulfonates; alkyl sulfates; alkylamide sulfonates, including fatty methyl taurides; the alkylaryl polyether alcohols; the fatty acid esters of polyhydric alcohols; the ethylene oxide addition products of such esters; and the addition products of long-chain mercaptans and ethylene oxide. Still other surface-active agents can be employed, the above merely showing a representative list of the more common materials.

It should be pointed out that the formulations of this invention may also include sticking or adhesive agents, indicators and other active biocidal ingredients. Such other ingredients may be supplementary insecticides, fungicides, bactericides, nematocides or selective herbicides.

While the invention has been specifically described with regard to several embodiments, it is not thereby limited, and it is to be understood that modifications and variations thereof obvious to those skilled in the art may be made without departing from the spirit or scope of the invention.

What is claimed is:
1. A compound of the formula

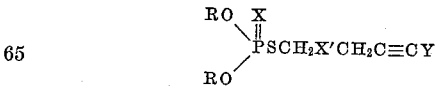

where R represents an alkyl radical having 1 to 8 carbon atoms, X and X' are selected from oxygen and sulfur, and Y is selected from hydrogen and

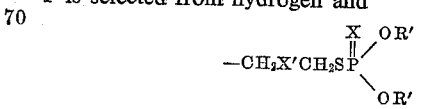

where R' represent an alkyl radical having 1 to 8 carbon atoms, and X and X' have the same meaning as above.

2. A compound of the formula

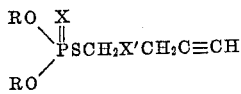

where R is a lower alkyl radical and X and X' are selected from oxygen and sulfur.

3. A compound of the formula

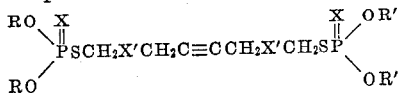

wherein R and R' represent lower alkyl radicals and X and X' are selected from oxygen and sulfur.

4. A compound of the formula

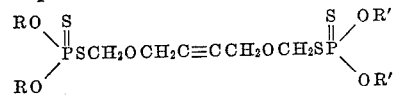

where R and R' represent lower alkyl radicals.

5. S,S'-(2,7-dioxa-4-octyne-1,8-dithiol) bis (O,O-diethyl phosphorodithioate).

6. S,S'-(2,7-dioxa-4-octyne-1,8-dithiol) bis (O,O-diethyl phosphorothiolate).

7. S,S'-(2,7-dioxa-4-octyne-1,8-dithiol) bis (O,O-dimethyl phosphorodithioate).

8. 2,7-dioxa-4-octyne-1,8-dithiol S-(O,O-dimethyl phosphorodithioate) S'-(O,O-diisopropyl phosphorodithioate).

9. O,O-diethyl S-(2-propynyloxymethyl) phosphorodithioate.

10. An insecticidal formulation comprising an insecticidal adjuvant and as an essential active ingredient thereof a compound of the formula

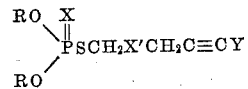

where R represents an alkyl radical having 1 to 8 carbon atoms, X and X' are selected from oxygen and sulfur, and Y is selected from hydrogen and

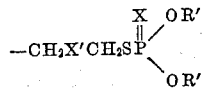

where R' represents an alkyl radical having 1 to 8 carbon atoms, and X an X' have the same meaning as above.

11. An insecticidal formulation comprising an insecticidal adjuvant and as an essential active ingredient thereof a compound of the formula

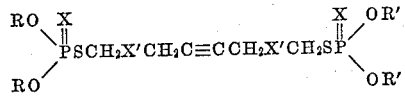

wherein R and R' represent lower alkyl radicals and X and X' are selected from oxygen and sulfur.

12. A method of protecting plants from insects which comprises treating the plant with a composition containing as an essential active ingredient a compound of the formula

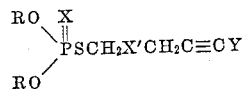

where R represents an alkyl radical having 1 to 8 carbon atoms, X and X' are selected from oxygen and sulfur, and Y is selected from hydrogen and

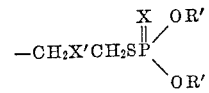

where R' represents an alkyl radical having 1 to 8 carbon atoms, and X and X' have the same meaning as above.

13. A method of protecting plants from insects which comprises treating the plant with a composition containing as an essential active ingredient a compound of the formula

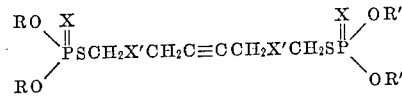

wherein R and R' represent lower alkyl radicals and X and X' are selected from oxygen and sulfur.

14. A method of combatting insects which comprises treating the insects externally and the insect habitats with a composition containing as an essential active ingredient thereof a compound of the formula

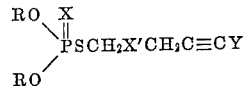

where R represents an alkyl radical having 1 to 8 carbon atoms, X and X' are selected from oxygen and sulfur, and Y is selected from hydrogen and

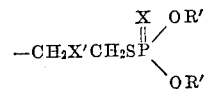

where R' represents an alkyl radical having 1 to 8 carbon atoms, and X and X' have the same meaning as above.

15. A method of combatting insects which comprises treating the insects externally and the insect habitats with a composition containing as an essential active ingredient thereof a compound of the formula

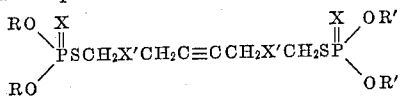

wherein R and R' represent lower alkyl radicals and X and X' are selected from oxygen and sulfur.

No references cited.